(12) United States Patent
Wu

(10) Patent No.: US 8,711,496 B2
(45) Date of Patent: Apr. 29, 2014

(54) MAGNETIC LEVITATION MOTOR USED IN LENS MODULE

(75) Inventor: Shang-Feng Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/570,278

(22) Filed: Aug. 9, 2012

(65) Prior Publication Data

US 2013/0235483 A1 Sep. 12, 2013

(30) Foreign Application Priority Data

Mar. 12, 2012 (TW) .............................. 101108238 U

(51) Int. Cl.
*G02B 7/02* (2006.01)
*G02B 7/08* (2006.01)
*G02B 7/04* (2006.01)
*H02K 41/03* (2006.01)
*H02K 23/04* (2006.01)
*G03B 9/22* (2006.01)

(52) U.S. Cl.
CPC .. *G02B 7/08* (2013.01); *G02B 7/04* (2013.01); *H02K 41/03* (2013.01); *H02K 23/04* (2013.01); *G03B 9/22* (2013.01)
USPC .... 359/824; 359/823; 310/154.28; 310/12.16

(58) Field of Classification Search
CPC ......... H02K 41/03; H02K 23/04; G02B 7/04; G02B 7/08; G03B 9/22
USPC .......... 359/823–824; 310/154, 154.28, 12.16; 396/451

See application file for complete search history.

(56) References Cited

U.S. PATENT DOCUMENTS

| | | | | |
|---|---|---|---|---|
| 2008/0247063 | A1* | 10/2008 | Otsuki et al. ................. | 359/824 |
| 2009/0252488 | A1* | 10/2009 | Eromaki et al. ............. | 396/529 |
| 2010/0309568 | A1* | 12/2010 | Takei et al. ................... | 359/824 |
| 2011/0170204 | A1* | 7/2011 | Park et al. ..................... | 359/824 |

* cited by examiner

*Primary Examiner* — Zachary Wilkes
*Assistant Examiner* — Daniele Manikeu
(74) *Attorney, Agent, or Firm* — Novak Druce Connolly Bove + Quigg LLP

(57) ABSTRACT

A magnetic levitation motor includes a fastening unit and a moving unit. The fastening unit includes a fixing frame and a first magnet assembly. The fixing frame includes a lower plate and four guiding poles extending upward from corners of the lower plate. The first magnet assembly includes four first magnets supported on the lower plate. Each first magnet is positioned between two adjacent guiding poles. The moving unit includes a moving frame and a second magnet assembly. The moving frame includes an outer surface and defines a receiving recess on the outer surface. The second magnet assembly includes four second magnets received in the receiving recess. The first magnets are positioned above the second magnets along an optical axis of the magnetic levitation motor.

8 Claims, 7 Drawing Sheets

MAGNETIC LEVITATION MOTOR USED IN LENS MODULE

BACKGROUND

1. Technical Field

The present disclosure relates to magnetic levitation motors and, particularly, to a magnetic levitation motor used in a lens module.

2. Description of Related Art

Voice coil motors (VCMs) are generally used in a lens module for driving a lens to find a focus position. The VCMs may include a moving unit, a fastening unit, a coil circled around the moving unit, a permanent magnet positioned on the fastening unit, and an elastic plate connected between the moving unit and the fastening unit. The permanent magnet generally surrounds the coil. As such, when the coil is supplied with a current, the coil will generate a Lorentz force under a magnetic field of the permanent magnet. As the permanent magnet surrounds the coil, the cross-sectional area of the lens module is undesirably increased.

Therefore, it is desirable to provide a magnetic levitation motor, which can overcome the limitations described.

DETAILED DESCRIPTION

Embodiments of the disclosure will now be described with reference to the drawings.

Figure 1:
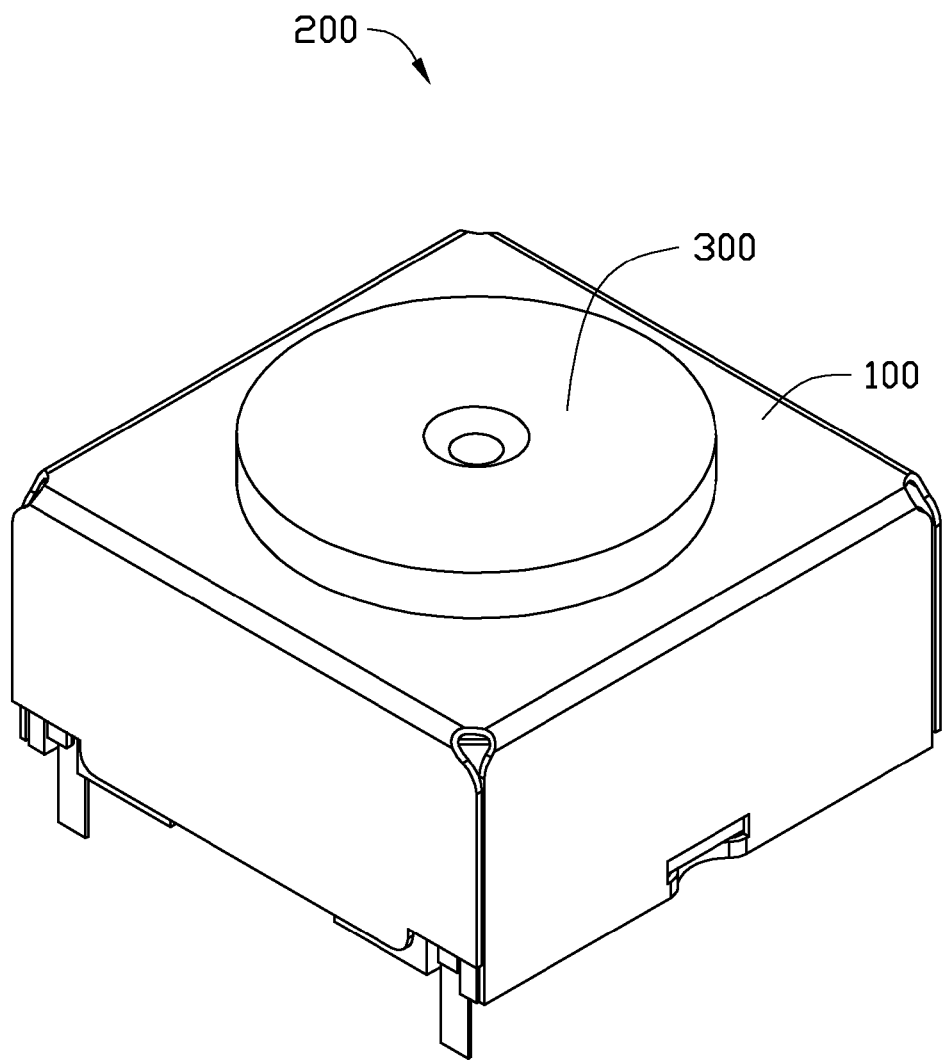
FIG. 1 is an assembled view of a lens module in accordance with an exemplary embodiment.
Figure 2:
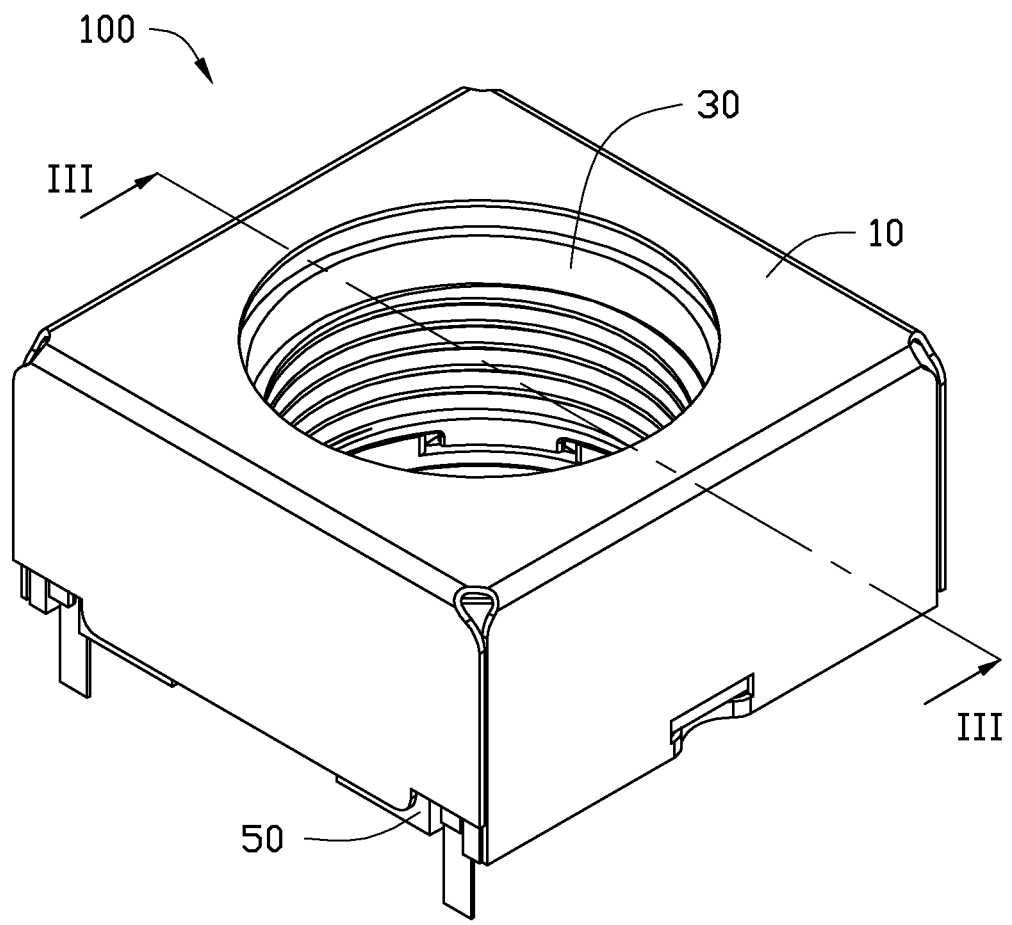
FIG. 2 is an assembled view of a magnetic levitation motor of the lens module of FIG. 1.
Figure 3:
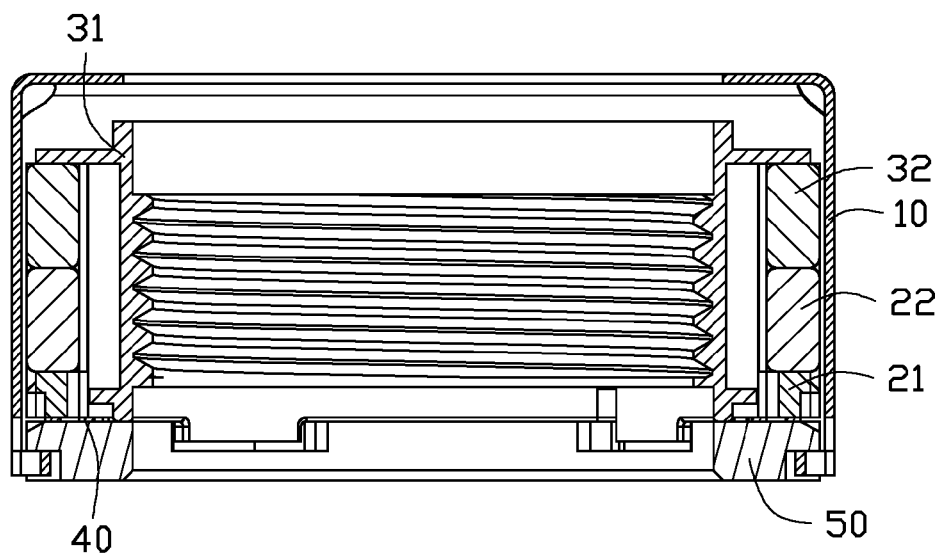
FIG. 3 is a cross-sectional view taken along a line III-III of FIG. 2.
Figure 4:
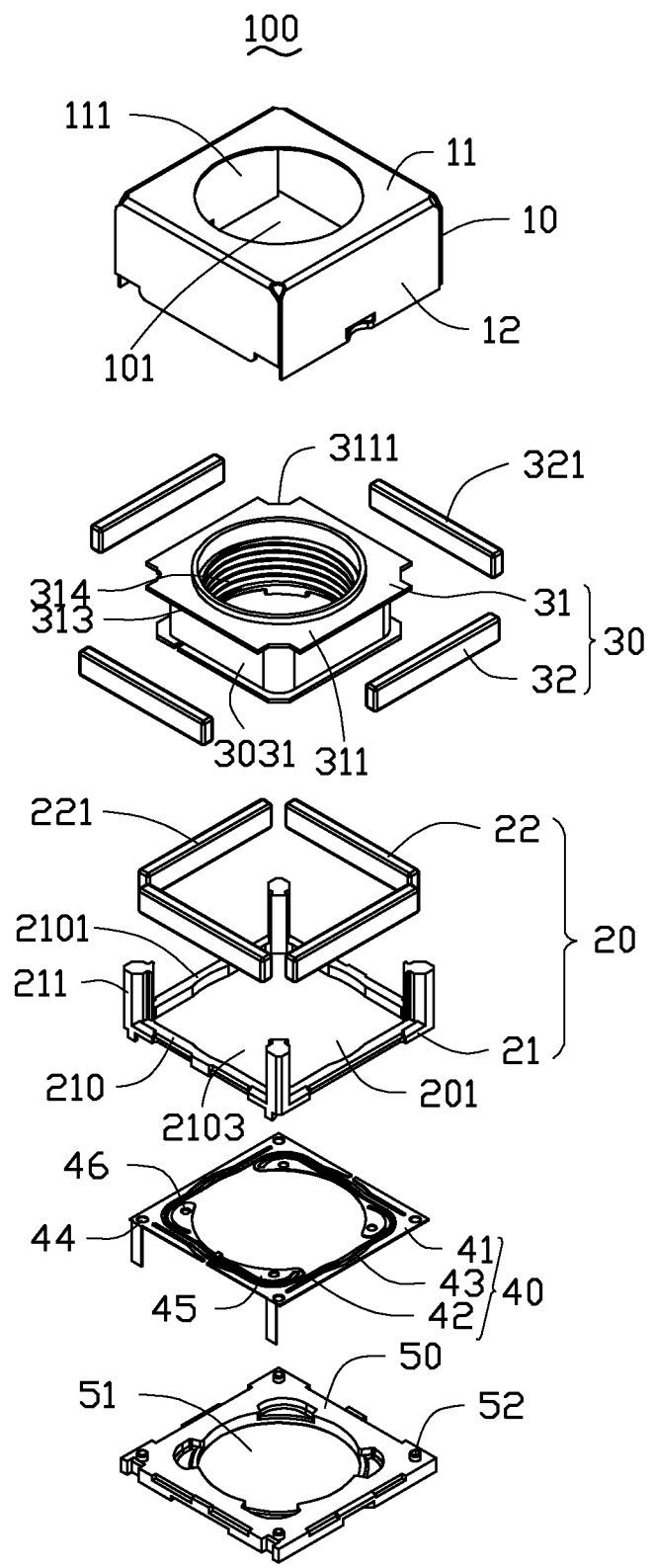
FIG. 4 is an isometric, exploded view of the magnetic levitation motor of FIG. 2.
Figure 5:
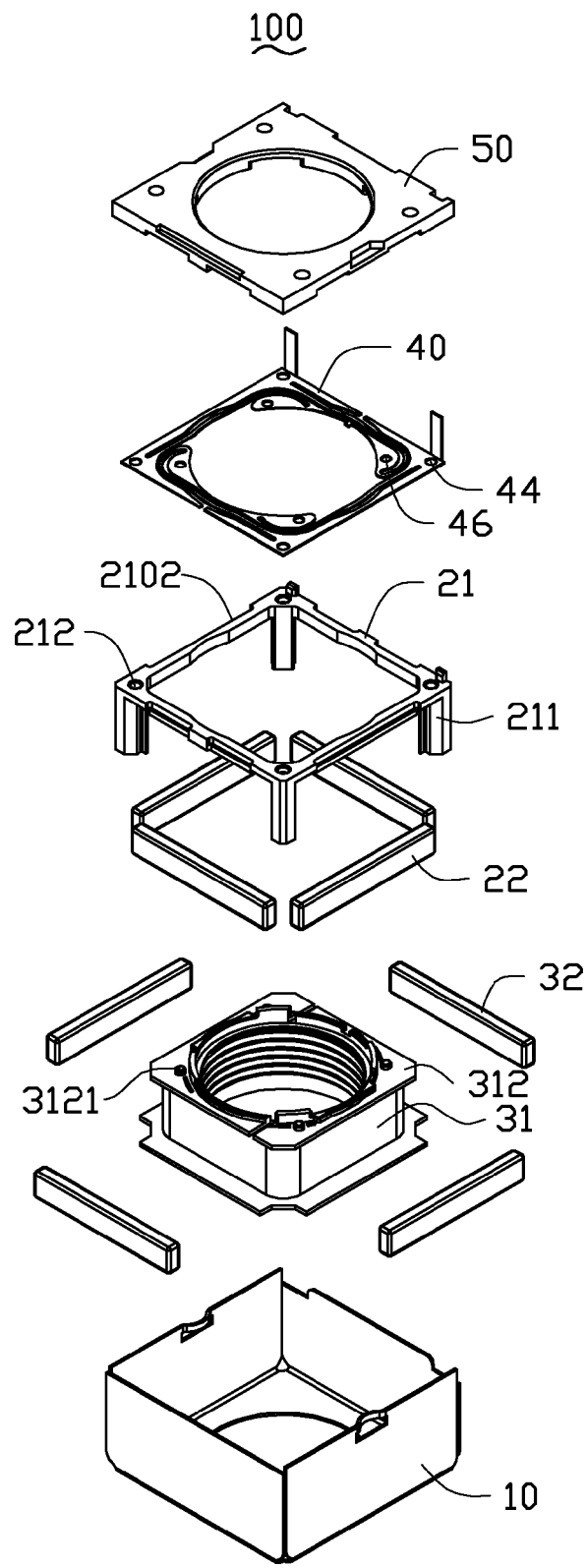
FIG. 5 is similar to FIG. 4, but viewed from another angle.
Figure 6:
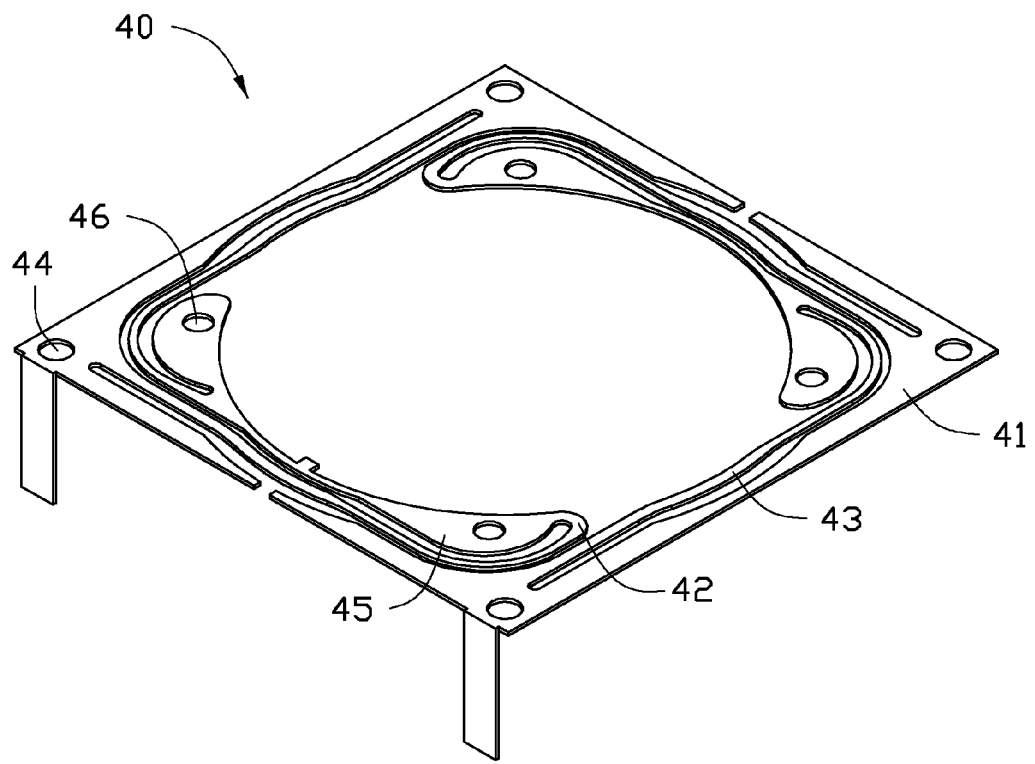
FIG. 6 is an isometric view of an elastic plate of the magnetic levitation motor of FIG. 2.
Figure 7:
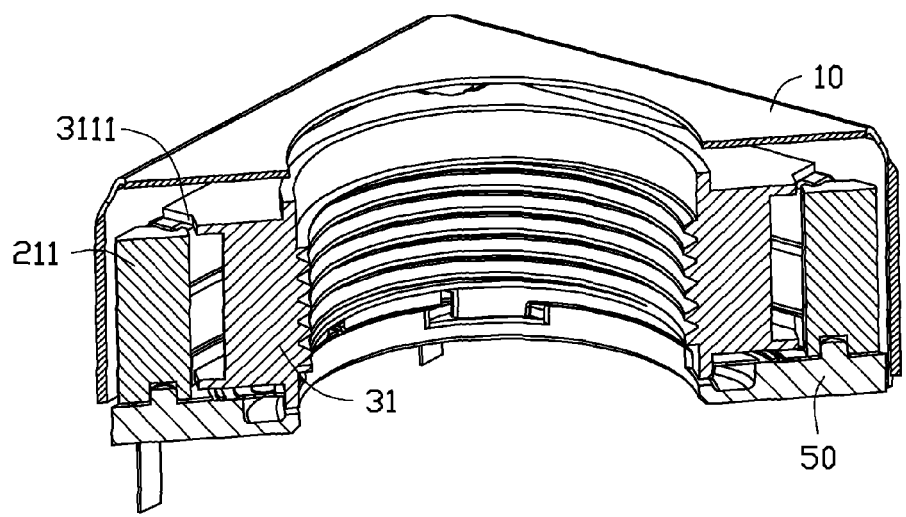
FIG. 7 is a cross-sectional schematic view of the magnetic levitation motor of FIG. 2.

Referring to FIG. 1, a lens module 200, according to an exemplary embodiment is shown. The lens module 200 includes a magnetic levitation motor 100 and a lens 300 received in the magnetic levitation motor 100. The magnetic levitation motor 100 is configured for driving the lens 300 to move along an optical axis of the lens module 200 to find a focus position.

Referring to FIGS. 2-6, the magnetic levitation motor 100 includes a casing 10, a fastening unit 20, a moving unit 30, an elastic plate 40, and a base 50.

The casing 10 is generally cuboid and includes a cover plate 11 and a sidewall 12 substantially perpendicularly extending downward from peripheral edges of the cover plate 11. The cover plate 11 and the sidewall 12 cooperatively define a first receiving room 101. The cover plate 11 defines a first through hole 111 generally at the center, communicating with the first receiving room 101. In this embodiment, the cover plate 11 is generally rectangular, and the sidewall 12 includes four plates extending downwards from the four edges of the cover plate 11 that are connected to each other.

The fastening unit 20 includes a fixing frame 21 and a first magnet assembly 22. The fixing frame 21 includes a lower plate 210 and four guiding poles 211 extending upward from corners of the lower plate 210. The lower plate 210 and the guiding poles 211 cooperatively define a second receiving room 201. The lower plate 210 is substantially square and includes an upper surface 2101 and a lower surface 2102 opposite to the upper surface 2101. The lower plate 210 defines a second through hole 2103 extending through the upper surface 2101 and the lower surface 2102. The lower plate 210 defines four blind holes 212 on the four corners of the lower surface 2102. The guiding poles 211 are positioned on the upper surface 2101 and extend along an optical axis of the levitation motor 100. The height of each guiding pole 211 is generally identical with each other.

The first magnet assembly 22 includes four generally rectangular first magnets 221. Each of the first magnets 221 is supported on the lower plate 210 and positioned between two adjacent guiding poles 211. The two adjacent guiding poles 211 are positioned on the same edge of the lower plate 210. In this embodiment, the first magnets 221 can be permanent magnets or electromagnets.

The moving unit 30 includes a moving barrel 31 and a second magnet assembly 32. The moving barrel 31 is square and includes a top surface 311, a bottom surface 312 opposite to the top surface 311, and an outer surface 313 connected between the top surface 311 and the bottom surface 312. The moving barrel 31 defines a third through hole 314 extending through the top surface 311 and the bottom surface 312. The moving barrel 31 defines a receiving recess 3031 on the outer surface 313. Four first positioning poles 3121 are extended downward from four corners of the bottom surface 312. The area of the top surface 311 is greater than that of the bottom surface 312, and four notches 3111 are defined at four corners of the top surface 311. Each of the four notches 3111 communicates with the receiving recess 3031.

The second magnet assembly 32 includes four generally rectangular second magnets 321. Each of the four second magnets 321 are received in the corresponding receiving recess 3031. In this embodiment, two opposite second magnets 321 are perpendicular to the other two opposite second magnets 321. The second magnets 321 can be the permanent magnets or the electromagnets.

The elastic plate 40 is substantially planar and includes an outer portion 41, an inner portion 42, and an elastic portion 43 connected between the outer portion 41 and the inner portion 42. The outer portion 41 defines four first connection holes 44 at the four corners thereof. The inner portion 42 includes four blades 45 adjacent to the corners of the outer portion 41. Each blade 45 defines a second connection hole 46.

The base 50 is square and centrally defines a fourth through hole 51. Four second positioning poles 52 extend up from the four corners of the base 50 respectively.

In assembly of the magnetic levitation motor 100, the elastic plate 40 is positioned between the fastening unit 20 and the base 50, and the second positioning poles 52 are received in the first connection holes 44 and the blind holes 212. The moving unit 30 is received in the second receiving room 201 of the fastening unit 20, and the first positioning poles 3121 are received in the second connection hole 46. The guiding poles 211 are coupled with the notches 3111. The first magnets 221 are positioned above the second magnets 321 along the optical axis.

The casing 10 receives the fastening unit 20, the moving unit 30, the elastic plate 40, and the base 50. In an initial state, the first through hole 111, the second through hole 2103, the third through hole 314, and the fourth through hole 51 are coaxial with each other.

In this embodiment, one of the first magnet assembly 22 and the second magnet assembly 32 is the permanent magnet and the other is the electromagnet. If the first magnet assembly 22 is the electromagnet, the second magnet assembly 32 is the permanent magnet and visa versa.

During the process of focusing, when the first magnet assembly 22 is supplied with a forward electrical current, the first magnet assembly 22 generates a magnetic field having same polarity with the second magnet assembly 32. Therefore, the moving unit 30 is driven to move away the fastening unit 20 along the optical axis to find a position of equilibrium, that is to say, a focus position. When the first magnet assembly 22 is supplied with a reverse electrical current, the first magnet assembly 22 generates a magnetic field having contrary polarity with the second magnet assembly 32. Therefore, the moving unit 30 is driven to move toward the fastening unit 20 along the optical axis.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A magnetic levitation motor, comprising:
   a fastening unit comprising:
      a fixing frame comprising a lower plate and four guiding poles extending upward from corners of the lower plate; and
      a first magnet assembly comprising four first magnets supported on the lower plate, and each of the first magnets positioned between two adjacent guiding poles;
   a moving unit comprising:
      a moving barrel comprising a top surface, a bottom surface opposite to the top surface, and an outer surface connected between the top surface and the bottom surface, the moving barrel defining four notches at four corners thereof, each notch running through the top surface and the bottom surface, the moving barrel defining a receiving recess on the outer surface; each of the guiding poles received in a respective one of the notches; and
      a second magnet assembly comprising four second magnets received in the receiving recess, the first magnets positioned above the second magnets along an optical axis of the magnetic levitation motor.

2. The magnetic levitation motor of claim 1, wherein each of the first magnets is an electromagnet, and each of the second magnets is a permanent magnet.

3. The magnetic levitation motor of claim 1, wherein each of the first magnets is a permanent magnet, and each of the second magnets is an electromagnet.

4. The magnetic levitation motor of claim 1, further comprising an elastic plate connected between the fastening unit and the moving unit.

5. The magnetic levitation motor of claim 4, wherein the elastic plate comprises an outer portion, an inner portion, and an elastic portion connected between the outer portion and the inner portion.

6. The magnetic levitation motor of claim 5, wherein the outer portion is connected with the fixing frame, and the inner portion is connected with the moving barrel.

7. The magnetic levitation motor of claim 5, further comprising a base, wherein the outer portion is sandwiched the base and the fixing frame.

8. A lens module, comprising:
   a magnetic levitation motor, comprising:
      a fastening unit comprising:
         a fixing frame comprising a lower plate and four guiding poles extending upward from corners of the lower plate; and
         a first magnet assembly comprising four first magnets supported on the lower plate, and each of the four first magnets positioned between two adjacent guiding poles; and
      a moving unit comprising:
         a moving barrel comprising a top surface, a bottom surface opposite to the top surface, and an outer surface connected between the top surface and the bottom surface; the moving barrel defining a through hole extending through the top surface and the bottom surface and a receiving recess on the outer surface; the moving barrel defining four notches at four corners thereof, each notch running through the top surface and the bottom surface, each of the guiding poles received in a respective one of the notches; and
         a second magnet assembly comprising four second magnets received in the receiving recess, the first magnets positioned above the second magnets along an optical axis of the lens module; and
   a lens received in the through hole of the moving barrel.

* * * * *